United States Patent [19]
Smit et al.

[11] 3,772,688
[45] Nov. 13, 1973

[54] SECONDARY RADAR SYSTEM

[75] Inventors: Johny Abram Smit, Heemstede;
Samuel Maria Kneefel,
Noordwijk, both of Netherlands

[73] Assignee: Christiaan Haygens Laboratorium N.V., Noordwijk, Netherlands

[22] Filed: July 12, 1971

[21] Appl. No.: 161,676

[30] Foreign Application Priority Data
July 17, 1970 Netherlands................70/0623

[52] U.S. Cl. .................................. 343/6.5 LC
[51] Int. Cl. ........................................ G01s 9/56
[58] Field of Search............... 343/6.5 R, 6.5 LC

[56] References Cited
UNITED STATES PATENTS

| | | | |
|---|---|---|---|
| 3,153,232 | 10/1964 | Fletcher et al. | 343/6.5 LC X |
| 3,341,845 | 9/1967 | Deman | 343/6.5 LC |
| 2,595,141 | 4/1952 | Herbst | 343/6.5 R |
| 3,312,970 | 4/1967 | Bond | 343/6.5 R X |
| 3,122,737 | 2/1964 | Setrin | 343/6.5 R |
| 3,296,615 | 1/1967 | Page et al. | 343/6.5 R |

*Primary Examiner*—Malcolm F. Hubler
*Attorney*—Markva & Smith

[57] ABSTRACT

A primary and secondary radar system utilizing a common directional scanning antenna are located in an interrogator in order to obtain navigational information and identity for each of the interrogated transponders of the objects of interest. Selected objects are interrogated by a specific address for each object transponder, in a sequence determined by the position of the objects with respect to the interrogator. The desired information is obtained from each transponder reply which occur only at the moment of interrogation from the scanning directional antenna.

3 Claims, 7 Drawing Figures

FIG. 6

TRANSMISSION CODE

| | | |
|---|---|---|
| LOGIC „0" | : | 1 1 0 0 0 0 |
| LOGIC „1" | : | 1 1 1 1 0 0 |
| RECOGNITION CONDITION | : | <u>0</u> 1 1 x x x <u>0</u> |
| LOGIC „1" CONDITION | : | 0 1 1 <u>1 1</u> x 0 |
| RESET CONDITIONS | : | <u>0 0 0 0 0 0 0</u> |
| | | <u>0 1 1 0 1 0 0</u> |
| | | <u>0 1 1 0 0 1 0</u> |
| | | <u>0 1 1 1 0 1 0</u> |
| | | <u>0 1 1 0 1 1 0</u> |

FIG. 7

TRANSMISSION CODE

LOGIC „0"

LOGIC „1"

RECOGNITION CONDITION

LOGIC „1" CONDITION

RESET CONDITIONS

SECONDARY RADAR SYSTEM

The disclosure is concerned with the use of a secondary radar system in combination with a primary radar system.

The secondary radar system is intended to interrogate stationary and mobile objects in a certain area to collect desired information of these objects, specifically mobile objects concerning speed, course, distance and other navigational information and their identity.

For this purpose an interrogator is coupled to the secondary radar system while the responders are positioned in the objects.

The secondary radar system and the primary radar system have a common antenna in order to synchronize the two systems. Said antenna is a "highly directed" antenna.

For obtaining the desired information of a number of selected objects said interrogator is adapted to call the selected objects one by one in a predetermined sequence with an address which is different for each transponder by means of a special transmission code, said transmission code being reconstructible to overcome possible channel distortion during transmission, and suitable for synchronous transmission.

To provide for the necessary address information, to store the desired information of the searched objects and to plot the navigational information the interrogator comprises an address encoding means and a calculator. The address encoding means includes the necessary means for converting the address code to the transmission code, while the responder comprises a decoding and recognition means for decoding and recognizing the received transmission signal. In addition the responder is adapted to generate a short responding pulse after recognition of the received transmission signal as soon as a radar pulse of the primary "highly directed" radar antenna is scanning the responder. The short pulse of the responder is at a carrier wave frequency which is different from the carrier wave frequency of the radar pulses of the primary radar system.

The system according to the invention is particularly useful to operate in a situation in which mobile objects (such as ships in a harbor or river) move in a narrow flow of traffic, whereby the number of objects may be some dozens (e.g., about 40) in which the probability of a number of objects in a small angular interval is large, whereby the objects may hide themselves partly behind other objects.

The invention relates to a secondary radar system, the interrogator of which is coupled to a radar installation and the responder beacons are either stationary mounted or mounted in mobile objects.

As generally known, a secondary radar system is a radar system, in which the object to be detected participates technically actively in the determination of its position. This participation consists in the fact that waves emitted by the radar installations are received by a receiver mounted in the object or target. The waves (pulses) received in the target excite an associated transmitter, the emission of which is received by the radar installation. The assembly of receiver and transmitter in the object (the target) will hereinafter be called responder beacon or responder.

The response pulses of the responder are transmitted at another frequency than that at which the interrogation from the radar installation is effected. The mobile or stationary radar installation will herein-after be called radar station.

A conventional interrogation procedure is that in which in response to a general calling signal each responder emits its encoded response, from which the identity of the responder and, consequently, of the target in which the responder is mounted, will appear upon receipt of this signal in the radar station, so that the scanned target is identified on the screen of a search radar present in the radar station.

In a situation in which many targets are present and/or the interspaces between the targets are small, this will result in overlapping code signals in the receiving portion of the interrogator in the radar station.

When a plurality of radar stations can interrogate a selected responder, this may lead to the situation in which the responder cannot cope with the interrogation messages or in which the code signals are disturbed, also called "fruit." This situation can occur in busy entrances to a harbor area and the harbour area itself, where a large number of ships navigate with different courses and speeds with respect to each other, and where one or more radar stations ashore collect and record the desired information on the movements of the ships.

Therefore, the invention relates particularly to a secondary radar system adapted to operate in a situation in which the targets predominantly move in a narrow flow of traffic, in which the number of targets may be some dozens (e.g., about 40), in which the probability of a number of targets in a small angular interval is large (with a maximum of e.g., 10 targets) and in which the minimal distance between the targets is in the order of the dimensions of the targets.

Furthermore, the secondary radar system according to the invention should meet the requirement that within a given period of time ($t_1$ sec.) the position of each target is measured again. This period of time $t_1$ will depend, inter alia, on the mobility of the targets.

The drawback of overlapping code signals can be reduced by using a narrow beam and by, moreover, selecting the time and frequency contents of the signals such that all signals are orthogonal with respect to each other.

A method of realizing same would be to have the responders respond to a general calling signal at one carrier wave frequency but with a duration of the recognition code that is smaller than the equivalent minimal distance between two targets.

Another possibility is to have the responders respond with one signal, the maximal duration of which is equal to the equivalent minimal distance between two targets, while the signal is composed of, for instance, four pulses overlapping each other in time, echo pulse being modulated at a different carrier wave frequency. The frequency combination will then determine the recognition code.

The above possibilities can be realized but lead to a complex equipment, both in the radar station and in the responder.

All the above methods provide a rapid, accurate measurement of the distance but an accurate angular measurement requires at least the time during which the antenna beam scans the target.

Known methods of angular measurement are based on the determination of the center of a number of received pulses or the determination by means of a monopulse antenna of the moment that the center of th antenna beam is directed at the target.

In view of the aforesaid target situation to be expected and the time interval $t_1$ between two measurements at each target, even in the case of slowly moving targets, succh as ships, in which $t_1$ will be about 10 sec., and a speed of rotation of the antenna of 20 rev. per min., the change is slight that these angular measurement methods will lead to the desired result.

It is an object of the invention to provide a solution for all the above drawbacks and, moreover, in such a manner that the orthogonality between the signals is obtained without a complex equipment in the responder being required. The later feature is essential, since in the case of use aboard ships the responder should be easily carried and installed by a pilot, while in the case the secondary radar system is to be used in aeroplanes it is self-evident that the responder aboard the plane should be as small and light as possible.

The object is achieved due to the fact that according to the intention for obtaining desired target data, such as bearing and distance, of preselected target, during the searching sweep the responder beacons are arranged such that, when they have received their address message and have recognized same, they can respond with a short pulse only at the moment they are scanned by a radar pulse of a primary radar system and that the interrogator is coupled in angle and time to the primary radar system by means of a common radar antenna.

The interrogator comprises both an address encoding means, in which the address of responder beacons to be called during a searching sweep are stored in sequence of calling, and a calculating means for calculating the target positions by means of the bearings and distances obtained from the response pulses of the called responder beacons and by means of these calculated data, supplying an address sequence to the address encoding means for the next searching sweep.

Consequently, all the separately addressed targets, which are under surveyance of this radar station, can be interrogated one by one from this radar station in the sequence in which the addresses are stored in a memory which may be provided, for instance, in the address encoding means. The interrogation sequence can be determined in a general searching procedure, in which initially only the respective addresses but not the associated positions are known.

It will be clear that due to the different courses and speeds of the targets with respect to each other, the address sequence in the direction of the searching sweep will change continuously. If one wishes to be able to call all selected responder beacons during a searching sweep so as to receive therefrom the data determining the positions thereof, it will be necessary that at the beginning of each searching sweep the respective addresses are present in the address encoding means of the interrogator in the proper sequence. This is possible only when the calculating means continuously calculates a series of instantaneous positions for each beacon, from which the future beacon positions can be determined by extrapolation.

In order to be able to each time obtain the instantaneous position of each called responder, according to the invention a position measurement is coupled to the address selective interrogation, which position measurement operates fast and highly accurately as, after recognition of the call, the responder emits only one short pulse.

Although in principle the system according to the invention can operate at each carrier wave frequency, the use of carrier wave frequencies in the microwave region offers special advantages. Sometimes it may also be desirable to alter the code of a given responder. To this end there is the possibility to transmit an instruction along with the original address, which instruction alters the setting of the address code. After this the responder is accessible only to the new address. Apart from advantages in connection with a possibly desired secrecy of the responder address, this may provide important operational advantages. By coupling the primary and secondary radar not only in time but also in angle, by using for both an identical antenna with narrow beam width, low side-lobe level and high antenna yield, it becomes possible to carry out an accurate position measurement at targets which are much longer than the resolving power of the primary radar. Moreover, objects that may produce disturbing reflections are scanned within a narrow beam only, while the disturbing influence of nearby radar stations on a responder is considerably reduced.

Since, as stated in the above, an accurate angular measurement is of vital importance particularly in a busy harbor area, the use of a highly directed antenna is preferred. By "highly directed antenna" is understood an antenna which is capable of providing accurate bearings of a large number (e.g., 10) of targets within a proportionally small angular interval. A highly directed antenna suitable for this purpose has been described in Dutch Pat. application No. 68,12918.

By means of such an antenna it is possible to unambiguously determine with great accuracy the direction (bearing) from a single received pulse (accuracy of about 0.1°). Since by means of the radar system according to the invention the angular measurement can be realized with a short pulse (pulse length e.g., 0.1 microsec.), it is possible to sufficiently accurately measure the distance at the same time.

Perhaps one might think of a combination of a bearing antenna with one of the above known interrogation systems. A detailed consideration will show, however, that the reception of a composite signal of two or more responders does not lead to an unambiguous angular measurement, so that the effect fof the highly directed antenna is lost completely.

Therefore, an extremely accurate secondary radar system that optimally meets all the requirements set will be obtained by means of a combination of an address selective calling system, in which the response consists of only a single short pulse synchronous with the primary radar and an antenna (bearing antenna), in which an unambiguous angular measurement is possible with a single short pulse only.

As far as the address code is concerned it is preferred to convert this code to a transmission code which is adapted to the channel properties, so that no detrimental effects are experienced caused by pulse prolongation, pulse disturbance, fading and noise. Moreover, the transmission code may be such that several other advantages are obtained, which shall be discussed later on.

Attention is drawn to French Pat. No. 1,407,415. This patent discloses a secondary radar system in which a selective interrogation of a plurality of targets is effected, particularly of aeroplanes carrying a responder. A number of objections are recognized, which may occur when a large number of targets simultaneously respond to the interrogation. No address selection is used. In the French patent it is tried to remove these objections by means of a selection in groups and, where aeroplanes are concerned, a selection of groups of aeroplanes flying at the same height. No position measurement is contemplated here.

The invention will be elucidated with reference to the drawings, a which:

FIG. 6 shows an example of the transmission code used; and

FIG. 7 shows some waveforms of the transmission code.

Figure 1:
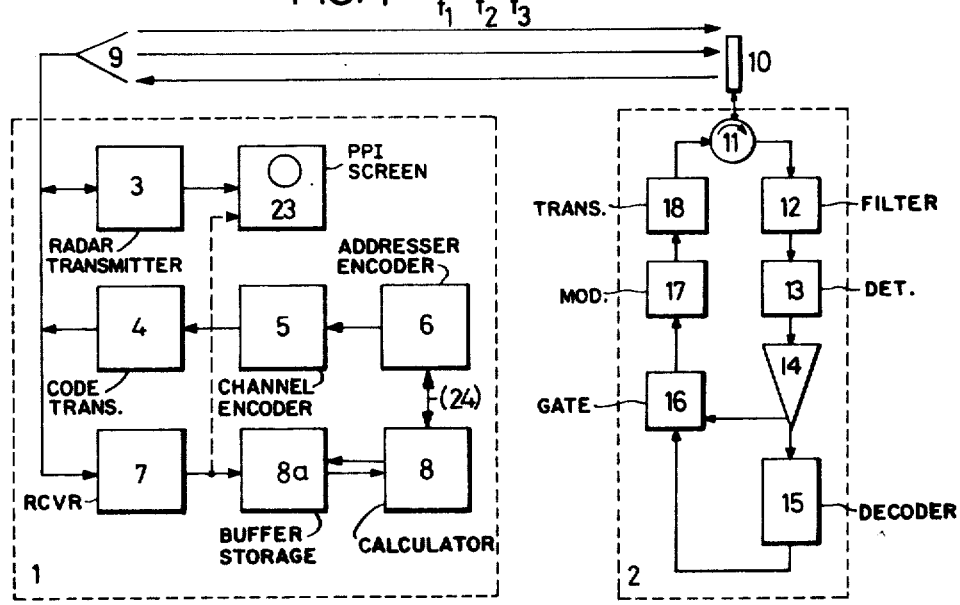
FIG. 1 shows a block diagram of the radar system according to the invention.

The block diagram according to FIG. 1 shows the radar station 1 and the responder beacon 2.

The radar station comprises an interrogation (addressing) circuit including:

An address encoding means 6 for converting, for instance, a decimal address number to a binary address; a channel encoding means 5 for converting the binary address to a transmission code which is adapted to the channel properties and a code transmitter 4 emitting the transmission code 19 (see FIG. 2) at a carrier wave having a frequency f2 by means of an antenna 9.

The responder 2 comprises a code receiver including an antenna 10, a circulator 11, a filter 12, a detector 13 and an amplifier 14. Furthermore, the responder 2 comprises a decoding and recognizing means 15 by means of which the incoming disturbed signals of the transmission code are reconstructed and this transmission code is converted to a binary code which is compared with the address of the responder in question.

As stated above, the interrogation circuit is composed such that a specific address code is transmitted to only one responder at the time.

After recognition of the address in the decoding and recognition means 15, a gating signal 21 (see FIG. 3) is applied to a gating circuit 16.

This enables the responder 2 to respond to the primary radar pulse 20, which follows the code and is emitted by the radar transmitter 3 at a carrier wave frequency f2, with a short pulse 22 at a carrier wave frequency f3.

This responder pulse 22 is received at the radar station 1 through antenna 9 in a receiver 7 arranged for that purpose.

The short pulse 22 received by the receiver 7 is passed to the calculating means 8 through a so-called information extractor 8A for further processing. This extractor 8A is a buffer memory between the rapidly operating radar antenna and the slower calculating means.

The responder position can be calculated from the measured angular position of the antenna 9, which is measured in a manner as described, for instance, in the above Dutch Pat. application No. 68,12918, and from the time difference between the instant of emission of the radar pulse 20 and the instant of reception of the responder pulse 22, in each desired system of coordinates by means of a calculating means 8 suited for the purpose.

As stated above, the calculation of the responder position is essential for obtaining the address sequence according to which a number of responders must be called during each searching sweep. This information is applied to the address encoding means 6 through the line 24.

The calling of a target should commence a short while before the antenna beam scans the target. Consequently, the position of the target in question should already be known from previous measurements by means of extrapolation.

A first arrangement of the targets to be measured could be obtained, for instance, by measuring the targets moving from the left to right during one revolution of the antenna and the targets moving from right to left during the next revolution.

The introduction of a new target into the system can be realized, for instance, by interrupting the programmed interrogation during a revolution of the antenna and to emit during this revolution the interrogation code of the new target until this target responds and, consequently, its position becomes known.

In order to be able to emit the address of the new target to be interrogated (detected) in the form of an interrogation code, it will be clear that first this calling address must in some way or other be introduced into the system. This may be done manually. It will also be clear that, if desired, a first position measurement can be manually introduced into the system.

The dotted connection between the receiver 7 and a PPI screen 23 indicates a possibility to either superimpose the responder pulse 22 on this primary radar PPI-screen or to merely reproduce these pulses 22 on this screen.

It is observed, that, in order to keep the diagram clear, FIG. 1 shows the necessary connections between the different components represented by blocks in a simplified manner only.

Insofar as the radar installation is intended for the coordination of relatively slow targets, which will usually be the case for the control of shipping in entrances to a harbor area, not all the ships present have to be interrogated during each searching sweep of the antenna. The calculating means can be programmed such that the addresses are divided into interwoven groups which are called in a predetermined sequence of searching sweeps. In other words, the target can be arranged on a number of lists in sequence of their bearings, all the targets on one list being interrogated during one searching sweep of the antenna, while the number of lists is not larger than necessary to avoid overlapping of the interrogation sectors or of the distance gates of successive targets.

Besides producing the information required for the address encoding means 6, the calculating means may also be used for several other tasks, such as the supliance of information to a display unit. It will also be necessary to remove and transfer the information on a certain target to a successive radar region when the target leaves one region to enter a next one. Self-evidently, a different bearing and distance will pertain thereto.

Although the programming of the calculating means forms no part of the actual invention, an overall enumeration of a number of tasks which the calculating means might perform is given to gain some insight in the matter. Of course this enumeration is not exhaustive.

1. The suppliance of address, bearing, distance, course and speed of each target;
2. the determination of the smallest sector within which each target can be expected during the next interrogation;
3. the arrangement of the targets in a number of address sequences (lists) in sequence of their bearings, all the targets on one list being interrogated during one searching sweep of the antenna, while the number of listst is not larger than necessary to avoid overlapping of the interrogation sectors or of the distance gates of successive targets;
4. the conversion of polar coordinates (bearing and distance) of each target measured with the primary radar to cartesian coordinates of a system selected by the calculating means itself out of a number of possibilities by mean of the measured polar coordinates;
5. the conversion of the cartesian coordinates (target position) obtained sub 4 into a binary decimal number and the storage of these data according to address, bearing and distance;
6. the periodic suppliance of the information mentioned sub 5 upen request;
7. the conversion of the information mentioned sub 5 to another system of coordinates (the display unit coordinate system) and the storage of the thus obtained information and the suppliance of this information upon request;
8. the periodic reception of new target data from the information extractor by means of which the information mentioned sub 1 is corrected;
9. the determination of components of speed from the periodic correction of the information mentioned sub 4 through 1 and the correction therewith of the data mentioned sub 4 for amending the listst mentioned sub 3.

The address code can be each binary code having a fixed number of bits, e.g. 10.

The transmission code is such that this code can be reconstructed in spite of occurring channel distortion, such as pulse prolongation, pulse disturbance, fading and noise.

The pulse prolongation is due to disturbing reflections of other targets, as these targets may become very close to each other, and due to reflections of parts of the target itself.

The pulse disturbance is due to signals of either the radar installations present at the targets themselves, which are used but which are not associated with the system described in the application, or of nearby radar installations of stations operating in adjoining regions.

Furthermore, the transmission code is arranged to permit asynchronuous code transmission.

This has the advantage that it is possible to decode by means of a clock generator signal that is not coupled to the clock generator signal of the channel encoding means 5, as a result of which frequency variations of some percents become allowable.

This allows of instantaneous decoding of the short duration address code signals, which enter the responder at arbitrary moments.

Furthermore, it is advnatageous to compose the transmission code so as to permit automatic gain control, to be called A.G.C. hereinafter.

By using part of the code, the gain control can be actuated when decoding this part, after which there is still sufficient time for the A.G.C. to start up before the actual address is received. This is achieved by means of a prefix of sufficient length.

There follows an example of a code having the above properties.

The code alphabet consists of two digits (e.g. "0" and "1"). By means of this alphabet code words are composed having constant lengths, e.g. ($6+M$) letters in the form: 00000 1 $X_1 \ldots X_M$, in which each $X$ represents a "0" of "1" in dependence upon the address.

The combination, viz. the prefix "00000 1" is such that in the case of a fully open receiver a 100 percent pulse prolongation of the transmission code pulses is allowable.

After decoding the first two "0" bits, the A.G.C. is actuated, the degree of control being determined by the measured signal intensity.

The next three "0" bits serve as a start-up period for the A.G.C., while the "1" bit provides a check of the control.

A transmission code is substituted for each letter in the channel coding means 5, which transmission code has the following form:

for the letter "0" : 1 . . . 1 0 . . . 0 0 . . . 0 and for the letter "1" : 1 . . . 1 1 . . . 1 0 . . . 0

The combination 01 . . . 1 is the recognition of each transmission code letter.

The occurrance of this recognition determines whether an address code letter can be decoded and thereafter written into an address memory.

Pulse prolongation and pulse disturbance can be compensated by the proper decoding of the combinations:

"01 . . . 1 0 . . . 0"

and

"01 . . . 1 1 . . . 1"

The combination 0 . . . 0 present at the end of each transmission code letter is essential to guarantee a "01 . . . 1" combination in the next transmission code letter, even in the case of pulse prolongation.

There follows an example of the transmission code letters:

a "0" is 11 0000 a "1" is 11 11 00

If two samples per transmission code bit are taken in the channel decoding means 15, a clock variation of ±½ clock cycle is allowed over a full transmission code letter, so that the clock frequency tolerance, without pulse prolongation and negligible rise times,is:

$$\Delta f/f = \pm 1/24 = \pm 4.15 \times 10^{-2}$$

There follows a detailed description of a suitable embodiment of a responder 1 (FIG.1) associated with the system.

The antenna 10 is a vertically polarized omnidirective antenna in the horizontal plane and a narrow beam in the vertical plane.

The pulse disturbance caused by (ship) radar installations not associated with the system is considerably suppressed by using vertical polarization, since these radar installations predominantly use horizontal polarization.

The circulator 11 causes a separation between the receiving circuit from 10 to 12 on the one hand and the transmitting circuit from transmitter 18 to 10 on the other hand, and has a known structure.

The filter 12 is a microwave filter passing only the frequencies associated with the system.

It is observed in this connection that each radar station associated with the system has a natural frequency $f_2$.

The detector 13 and the amplifier 14 must provide an optimal transfer of the incoming signal to the video output.

This amplifier 14 is an essential component of the responder, since in this circuit variations in the transmission channel are compensated by means of the A.G.C. in cooperation with the transmission code.

Figure 4:
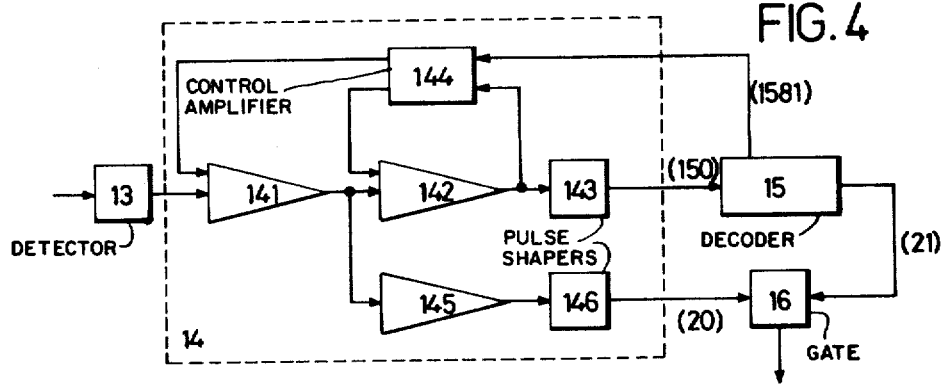
FIG. 4 shows a block diagram of the receiver in the responder beacon.

An example of an embodiment of amplifier 14 is shown in FIG. 4.

In this drawing, 141 and 142 are amplifying elements for the pulse signal 20 originating from the primary radar transmitter 3.

After recognition of the code reception by means of the first two "0" bits, the control amplifier 144 is actuated and controls elements 141 and 142.

By using this control it is achieved that pulse prolongation caused by over-excitation or by reflections of more remote objects is suppressed.

As a result thereof, the pulse prolongation margin built-in in the code remains available for reflections of the same order as the direct signal.

By controlling the A.G.C. by the code it is prevented that the receiver is not needlessly insensitive due to interference pulses.

The circuits 143 and 146 are threshold circuits converting analogous incoming signals, which are larger than the predetermined threshold value, into standardized signals.

The circuit 145 is the amplifier for the pulse signals of the primary radar.

These signals can be distinguished from the code signals by their intensity and much larger bandwidth.

Figure 5:
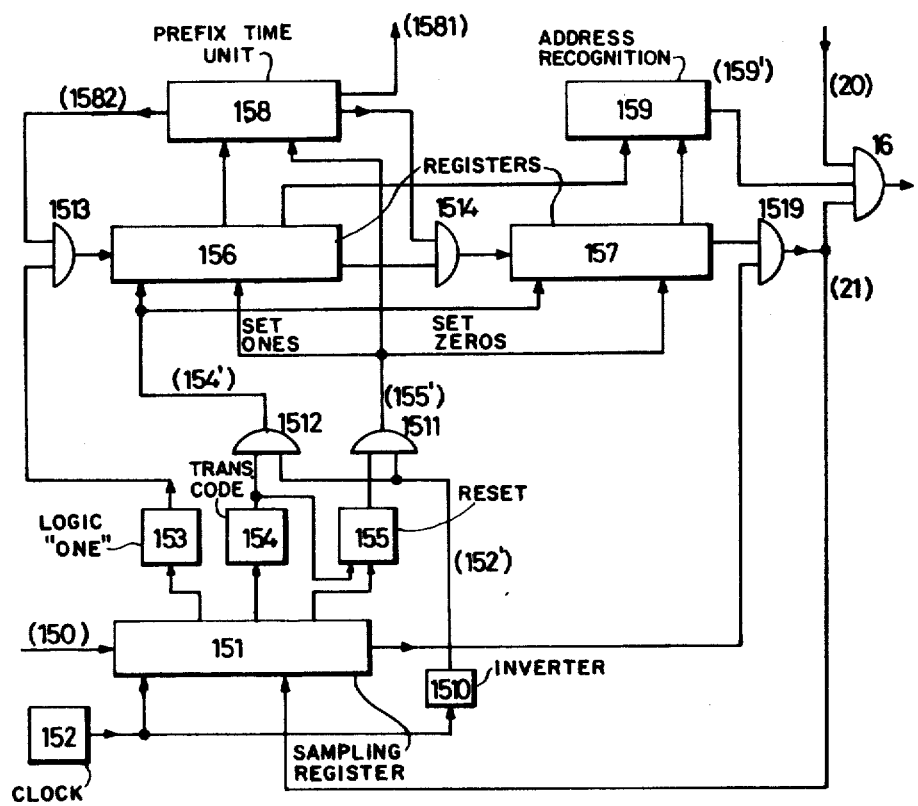
FIG. 5 shows the block diagram of the decoding means in the responder beacon.

There follows a detailed elucidation of the decoding means 15 with reference to FIG. 5.

The decoding and recognition means 15 comprises a channel decoding circuit and a message decoding circuit. In the channel decoding circuit each transmission code is converted to a logic "zero" or a logic "one" or is rejected completely.

The channel decoding circuit includes a sampling register 151, a synchronizing circuit (154, 1510, 1512), a circuit 153 for the recognition of a logic "one" in the transmission code and a reset circuit 155.

The standardized output signal 150 of the amplifier 14 is sampled and entered into the sampling register 151 by means of a clock generator 152.

The synchronizing circuit comprises a transmission code recognizing circuit 154, an inverting circuit 1510 and an AND gate 1512.

As soon as the recognition condition (see FIG. 6) in the transmission code is recognized, the shift pulse 154' is formed in the circuit 154 by means of the inverted clock signal 152'.

In the event of an error occurring in the transmission code or in the absence of a code, the message decoding circuit is reset by the reset circuit 155.

In this manner it is prevented that message mutations are produced due to errors.

The message decoding circuit comprises two registers 156 and 157, a prefix time unit 158 and an address selector and recognition circuit 159.

Furthermore, the decoding means 15 includes the circuit for forming the gating signal 21.

The operation will be discussed hereinafter.

As long as no transmission code is present or recognized in the register 151, the reset circuit 155 produces the reset signal 155' through AND gate 1511 in phase with the inverted clock signal 152'.

This reset signal 155' is used to fill register 156 with logic "ones" to its full capacity and to fill register 157 with logic "zeros" to its full capacity.

The transmission code is preceded by a prefix consisting of five logic "zeros" and terminating with a logic "one". Since upon receipt of the first transmission code the receiver is still set at its full sensitivity, there is a good chance that due to disturbances the transmission code for the logic "zero" is distorted to a code for a logic "one".

A special provision is made to be able to decode "zeros" during the fade-in period of the amplifier.

As long as the reset signal 155' is present and, consequently, register 156 remains filled with "ones", the AND gate 1513 and the AND gate 1514 will remain closed via circuit 158.

At the instant of recognition of the first transmission code, the reset signal 155' will disappear and the shift pulse 154' will occur.

The AND gates 1513 and 1514 remain still closed.

Upon each transmission code recognition, a logic "zero" is entered into register 156.

After two "zeros" the circuit 158 will form the control signal 1581, with which a gain control of amplifier 14 can be actuated.

This gain control can start up during the three next logic "zeros".

Hereafter signal 1582 becomes high and AND gate 1513 opens.

The last prefix letter, a logic "one", can be entered into register 156 after recognition in circuit 153.

When the last "zero" of the prefix has arrived at the last place of register 156, AND gate 1514 will open and will be closed only by means of a reset pulse 155'.

After conversion into a binary code, the incoming message is entered into the address register comprising registers 156 and 157.

The shift pulses 154' for the address code are still formed in the manner described above.

When the last prefix letter, the logic "one", has arrived at the end of register 157, while the last transmission code is present in register 151, with also a "one" at the last place, AND gate 1519 will open.

The gating pulse 21 is now formed as this signal resets some places in register 151, as a result of which after two clock pulses 152 a "zero" arrives at the end of register 151 and the AND gate 1519 closes again.

By resetting some places in register 151 it is achieved at the same time that no transmission code recognition can occur, while yet no reset condition is present.

As a result thereof an address remains in registers 156 and 157.

The received address is compared with a set address by means of the address selector 159.

If the two addresses are the same, the recognition signal 159' is formed.

The gating signal 21 will exist until a zero appears at the last place of register 151.

During the presence of gating signal 21 and recognition signal 159', a received radar pulse 20 can be passed to the modulator 17 through the gate 16 (see FIG. 1).

Upon termination of the gating signal 21, register 151 will contain only zeros, as a result of which one of the reset conditions is complied with.

The reset signal 155' will be formed again and the decoder and receiver are prepared for reception of a next transmission code.

Figure 2:
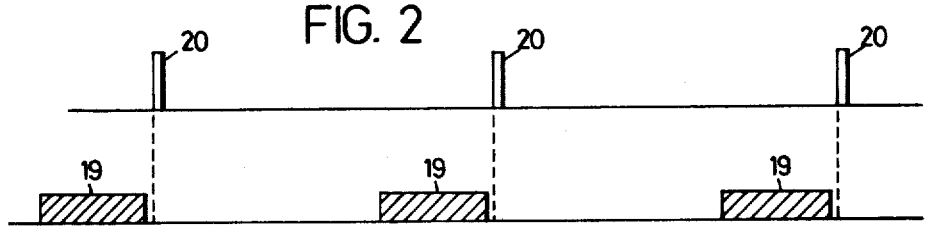
FIG. 2 shows the signals emitted by the radar station.
Figure 3:
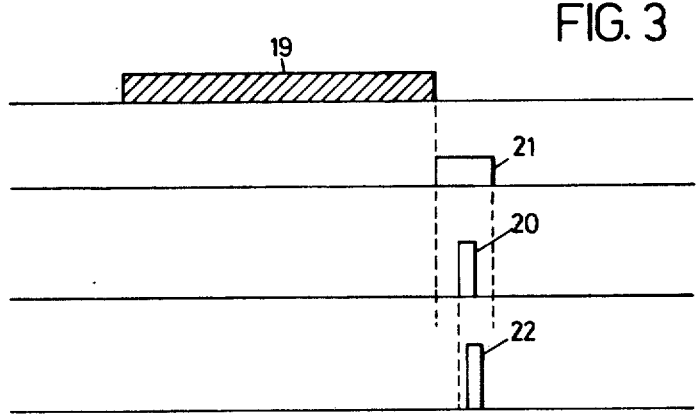
FIG. 3 shows the interrelationship of the signals in the responder beacon.

FIGS. 2 and 3 show the interrelationship between on the one hand the transmission signal 19 of the interrogator emitted by the radar station and the measuring signal 20 of the primary radar and on the other hand the gate preparing signal 21 formed in the responder 2 and the response pulse 22 generated by the gate 16, after the data has been opened by the measuring signal 20.

Assuming that in the case of slow targets, such as ships, the interspaces between the responders are small, e.g. 10 m., the installation should be capable, partly in view of a suitable rotary speed of the antenna, of producing an echo, say, every 400 microseconds. It will be clear that the decoding and recognition of the address transmission code by the responder will occupy a great part of this rest-period, at any rate far more time than the responder needs to react to the radar signal 20.

This problem is solved by connecting the output of the decoding and recognition means 15 to an AND gate 16, which gate is continuously triggered by the continuously emitted primary radar pulses 20 but does not open for the generation of a response signal until the transmission code is decoded and recognized and a preparatory signal 21 is formed at the input of the gate 16.

We claim

1. A secondary radar system comprising at least one interrogator and a plurality of responder beacons cooperating therewith, means for coupling said interrogator in time and angle to a primary radar system by means of a common directive scanning antenna, said responder beacons being either stationary mounted or mounted in mobile objects, said system further characterized in that for obtaining the desired data, such as bearing and distance, of a number of selected objects together with an object identification during one searching sweep, said interrogator includes means adapted for calling the selected objects one by one in a predetermined sequence by transmitting an address different for each responder beacon (2) by means of a transmission code, said transmission code being reconstructible after channel distortion and suitable for asynchronous transmission, and means in each said responder beacon responsive to having been called with its address and having recognized same for emitting a short pulse (22) at a carrier wave frequency other than the carrier wave frequency of the radar pulse (20) of the primary radar system only at the moment said beacon is scanned by said primary radar pulse.

2. A secondary radar system according to claim 1, wherein said interrogator comprises both an address encoding means in which the addresses of responder beacons to be called during one searching sweep are stored in calling sequence, and a calculating means for calculating the positions of the selected objects from the obtained bearings and distances, so as to compose an address sequence for a next searching sweep, characterized in that said address encoding means (6) is connected to a channel encoding means (5) for converting the address code to said transmission code, and that said responder beacon comprises a decoding and recognition means (15) for decoding and recognizing the received transmission signal and generating a short response pulse (22) after recognition thereof, as soon as an AND gate (16) is opened by said primary radar pulse (20).

3. A secondary radar system according to claim 2, characterized in that for asynchronously transmitting the transmission code said code is provided with an appropriate prefix and a freerunning clock generator (152) is coupled to said decoding and recognition means (15), and that for suppressing pulse prolongation due to over-excitation or reflections of more remote objects an automatic gain control (144, 141, 142) is provided in the amplifier (14) of said responder beacon (2), said gain control being adapted to be actuated and to start up during the decoding of the prefix before the actual address is received.

* * * * *